Oct. 31, 1961 P. G. BRIGGS 3,007,011
MAGNETIC TRANSDUCING HEADS
Filed June 4, 1958
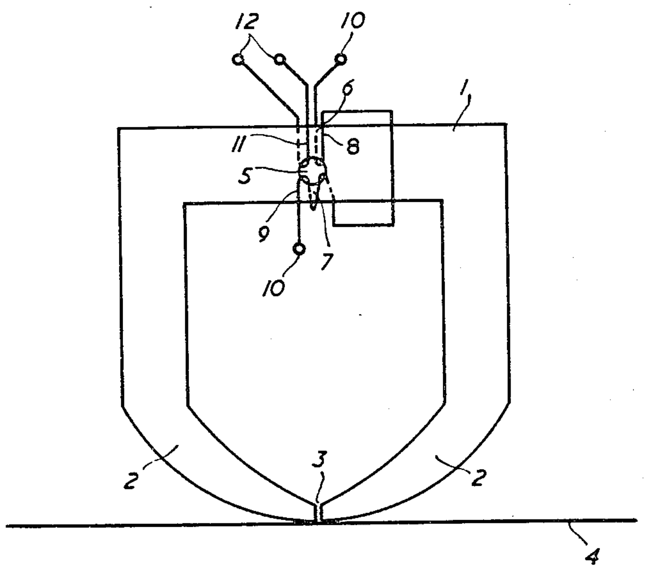
INVENTOR
PETER GEORGE BRIGGS
BY Hane and Nydick
ATTORNEYS 3,007,011

MAGNETIC TRANSDUCING HEADS

Peter George Briggs, Cambridgeshire, England, assignor to International Computers and Tabulators Limited, London, England Filed June 4, 1958, Ser. No. 739,798
Claims priority, application Great Britain July 26, 1957
12 Claims. (Cl. 179—100.2)

This invention relates to transducing heads for magnetic records.

It is frequently desired to render operative or inoperative at will a magnetic transducing head, which co-operates with a magnetic tape, drum or similar magnetic recording surface. This has been achieved by including switching devices, such as electromagnetic relay contacts or electronic gates, in series with the head winding which is used for reading or recording. Thus the switching is carried out at a point where the signal levels are relatively low and difficulties arise due to variable contact resistance and the pick up of spurious signals. Furthermore, a fairly complex switching network is required in order to select one head from many, for example, in track switching on a magnetic storage drum.

It is an object of the invention to provide an improved magnetic transducing head which is provided with a control winding for rendering the head operative or inoperative.

It is a further object of the invention to provide a magnetic reading head in which the head is normally inoperative and is rendered operative by energising a control winding.

It is another object to provide a magnetic reading head in which a magnetic circuit provides two paths for flux, a signal coil being coupled to each flux path, and in which one flux path may be magnetically saturated by a control coil.

The invention will now be described, by way of example with reference to the accompanying schematic drawing of a magnetic transducing head.

A reading head, shown schematically, comprises core member of ferro-magnetic material such as a lamination of Mumetal, with a back portion 1, and two side portions 2 which define an air gap 3. A magnetic record medium 4 containing the records to be read, is traversed past the gap 3, either in contact with the head as shown, or spaced a short distance from it.

In the back portion 1 of the head and centrally disposed in relation to the side portions 2 is a hole 5 which divides the portion 1 into two limbs 6 and 7 of unequal width, the width of limb 6 being the greater, to produce two paths of unequal reluctance for the magnetic flux. In practice it has been found that a ratio of approximately 2:1 in these two widths is satisfactory. Series-connected signal coils 8 and 9 encircle limbs 6 and 7 respectively. Coil 9 has twice as many turns as coil 8 and the direction of winding is such that the two coils are in opposition. The resultant output from the two coils appears at output terminals 10 of the coils.

A control winding 11 encircling limb 6 and connected to a relatively high impedance D.C. source 12 serves to control the output available at terminals 10 in a manner that will now be described. The use of a high impedance source ensures that the winding 11 does not exert any appreciable shunting effect on the coils 8 and 9.

In the absence of a control current in winding 11, the flux induced in the head as a result of sensing the magnetic record 4, divides itself between limbs 6 and 7. Thus a voltage is induced in each of the coils 8 and 9. These two voltages are nearly equal and since the coils are connected in series opposition only a small residual voltage appears across the terminals 10.

When a small direct current is passed through the control winding 11, an annular portion of material round the hole 5 is magnetically saturated. As the current in winding 11 is increased the width of the saturated annular region increases until the whole of limb 7 and approximately half of limb 6 is saturated by the flux from winding 11, when the ratio of the widths of the limbs 7 and 6 is 2:1. As the saturated region is extended, the signal flux due to the magnetic record 4 is gradually transferred from limb 7 to limb 6. At a specific value of control current the voltage in coil 9 balances that in coil 8 and the output at terminals 10 is a minimum. Further increase in control current causes the voltage in coil 8 to exceed that in coil 9 until limb 7 is completely saturated, when the output is a maximum, as no opposing voltage is induced in coil 9.

If the control current is still further increased, the saturated region spreads through limbs 2 towards the gap 3 and the field produced tends to erase the signals on the record medium 4.

Thus by changing the current through the control winding the output from the head can be regulated from a minimum (substantially zero) to a maximum. In addition the head will function as an erase head by suitable adjustment of the control current only.

When the output from one of a plurality of heads has to be selected, terminals 10 of all heads are connected in parallel to a common pair of output leads. Then selection can be effected by arranging that the control current through the windings 11 of individual heads is such that the output from the selected head is a maximum and that from all other heads is a minimum. Because the limbs 6 and 7 of the unselected heads are unsaturated in the state of minimum output, the coils 8 and 9 of these heads present a high shunt impedance to the signals from the selected head appearing on the common output line.

In order that the minimum output from all heads should be obtained with the same value of control current, individual heads can be balanced in one of several ways, such as by applying a fixed bias current to winding 11, by adjusting the turns ratio of coils 8 and 9, or by increasing the flux through limb 6 by placing laminations of magnetic material in parallel with the existing magnetic path.

Although the embodiment described acts as a reading head, the flux also across gap 3 due to a current through coils 8 and 9 can be regulated by means of a control current in winding 11, thus permitting a control to be exercised when the head is used for writing signals on the magnetic medium 4.

It will be appreciated that in the drawing, the parts of the head have been shown schematically and that they may be in practice of any suitable shape and size, and that the hole 5 need not be centrally positioned in the portion 1.

The ratio of the width of the limbs 6 and 7 may be other than 1:2, provided that one limb is saturated by a smaller control current that the other and that the ratio of the windings 8 and 9 is such that the voltages developed by the two coils are balanced at a value of control current, which value may be zero, which is less than that which produces saturation in either limb.

What is claimed is:

1. A magnetic transducing head comprising a magnetic core providing a magnetic circuit including a transducing gap, a portion of the magnetic circuit being divided into two separate flux paths of predetermined unequal magnetic reluctance, a signal winding coupled to each said flux path, the windings being connected in series opposition, and means for applying a unidirectional control magnetic flux to said portion of the magnetic circuit to control the effective coupling of one of said windings to the associated flux path.

2. A magnetic reading head comprising a magnetic core providing a magnetic circuit including a transducing gap, a portion of the magnetic circuit being divided into two separate magnetic flux paths of predetermined unequal reluctance, a signal winding coupled to each flux path, the signal windings being connected in series opposition and having a turns ratio such that the voltages induced therein by a flux across the transducing gap are normally substantially equal, and a control winding coupled to said portion of the magnetic circuit and means for energizing said control winding with a unidirectional current sufficient magnetically to saturate one of the flux paths to render the associated coil non-responsive to a flux across the transducing gap, whereby the magnetic head may be rendered effective or ineffective by the control winding.

3. A magnetic transducing head comprising a magnetic core member which has one portion including a transducing gap and another portion including a hole which divides the core member into two separate limbs of unequal widths, a signal winding embracing each limb, the signal windings being connected in series opposition, and a control winding coupled to the core and passing through said hole whereby one of said limbs may be selectively magnetically saturated.

4. A magnetic transducing head comprising a magnetic core member forming a closed magnetic circuit including a transducing gap and a portion divided into two parallel flux paths of unequal magnetic reluctance, a signal winding coupled to each flux path, the signal windings being coupled in series opposition, and a control winding coupled to said portion of the magnetic circuit and operable to magnetically saturate one of the flux paths.

5. A magnetic reading head comprising a lamination of magnetic material, a gap in the lamination operable as a transducing gap, a hole in the lamination dividing a portion of the lamination into two limbs of unequal width, a signal winding on each limb, the ratio of the numbers of turns on the windings being equal to the inverse of the ratio of the width of the limbs associated with the windings and the windings being connected in series opposition, and a control winding wound through the hole and coupled to the lamination whereby one of said limbs may be selectively magnetically saturated.

6. A magnetic transducing head according to claim 1 in which the relative dimensions of said flux paths are such that the ratio of their magnetic reluctances is at least 2:1.

7. A magnetic transducing head according to claim 6 in which the turns ratio of the signal windings is equal to the inverse of the ratio of the magnetic reluctances of the flux paths to which they are coupled.

8. A magnetic transducing head according to claim 5 in which the ratio of the width of said two limbs is at least 2:1.

9. A magnetic transducing head comprising a magnetic core providing a magnetic circuit including a transducing gap and having a portion divided into two separate parallel magnetic flux paths having unequal magnetic reluctances the ratio of the magnitudes of which is at least 2:1, a signal winding coupled to each flux path, the signal windings being connected in series opposition and having a turns ratio such that the voltages induced therein by a flux across the transducing gap are normally substantially equal, a control winding coupled to said portion of the core, and means for causing a unidirectional polarizing current to flow in said control winding.

10. A magnetic transducing head comprising a magnetic core member which has one portion including a transducing gap and another portion including a hole which divides the core member into two separate limbs of unequal widths, a signal winding embracing each limb, the signal windings being connected in series opposition, a control winding coupled to the core and passing through said hole, and means for causing a unidirectional control current through said winding to induce an area of magnetic saturation around said hole whereby one of the limbs may be selectively magnetically saturated.

11. A magnetic transducing head according to claim 10 in which the ratio of the widths of said limbs is at least 2:1.

12. A magnetic transducing head according to claim 11 in which the turns ratio of the signal coils is the inverse of the ratio of the widths of the limbs which they embrace.

References Cited in the file of this patent

UNITED STATES PATENTS

| | | |
|---|---|---|
| 2,855,464 | Wiegand | Oct. 7, 1958 |
| 2,870,267 | Duinker et al. | Jan. 20, 1959 |
| 2,901,549 | Serrell | Aug. 25, 1959 |
| 2,915,597 | Wanlass et al. | Dec. 1, 1959 |
| 2,933,718 | Arsenault | Apr. 19, 1960 |

FOREIGN PATENTS

| | | |
|---|---|---|
| 737,497 | Great Britain | Sept. 28, 1955 |